Figure 1:
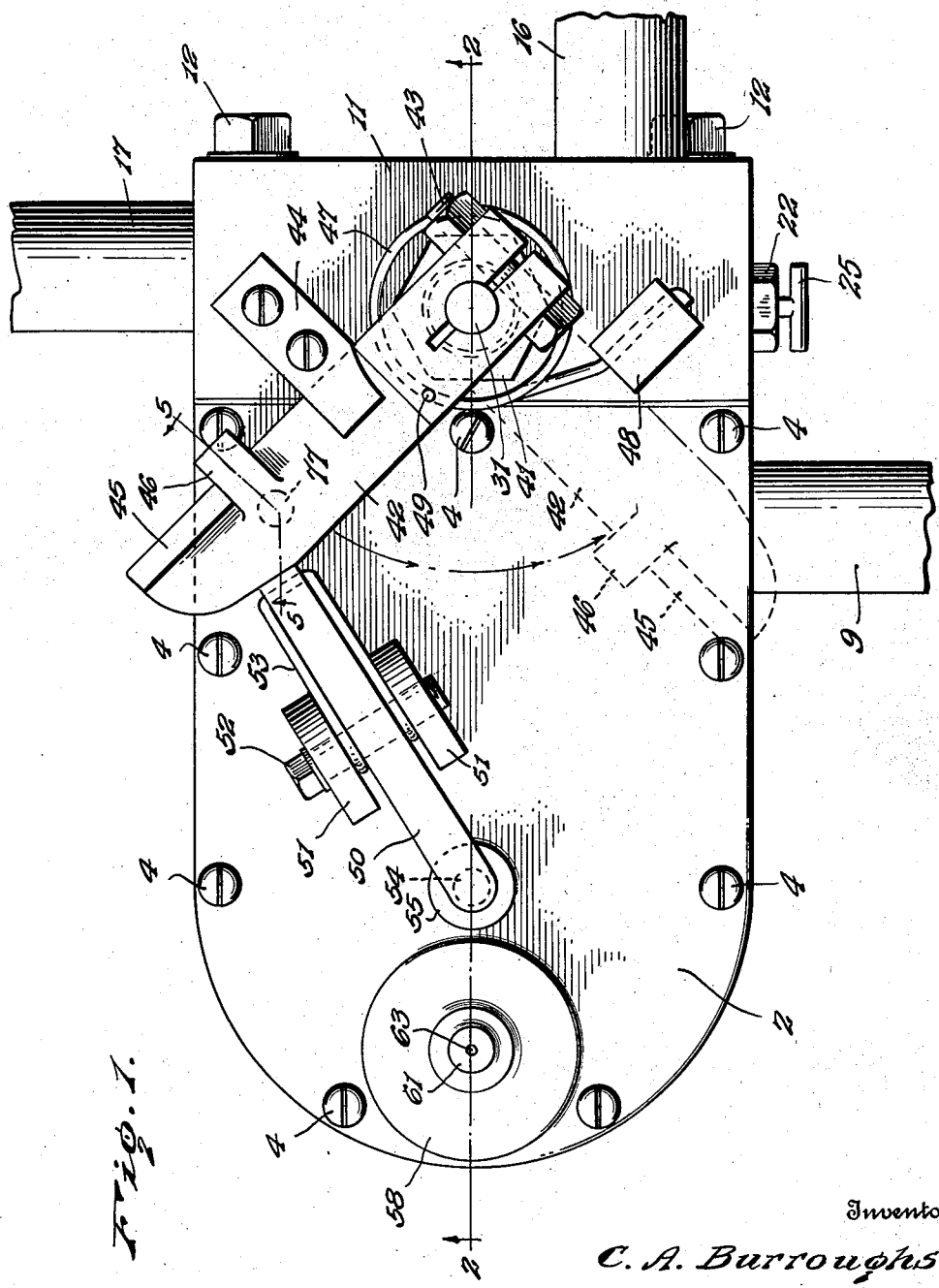

Dec. 10, 1940.　　　C. A. BURROUGHS　　　2,224,508
VALVE FOR LAWN SPRINKLERS
Filed Sept. 30, 1938　　　4 Sheets-Sheet 1

Inventor
C. A. Burroughs.
By Lacey & Lacey,
Attorneys

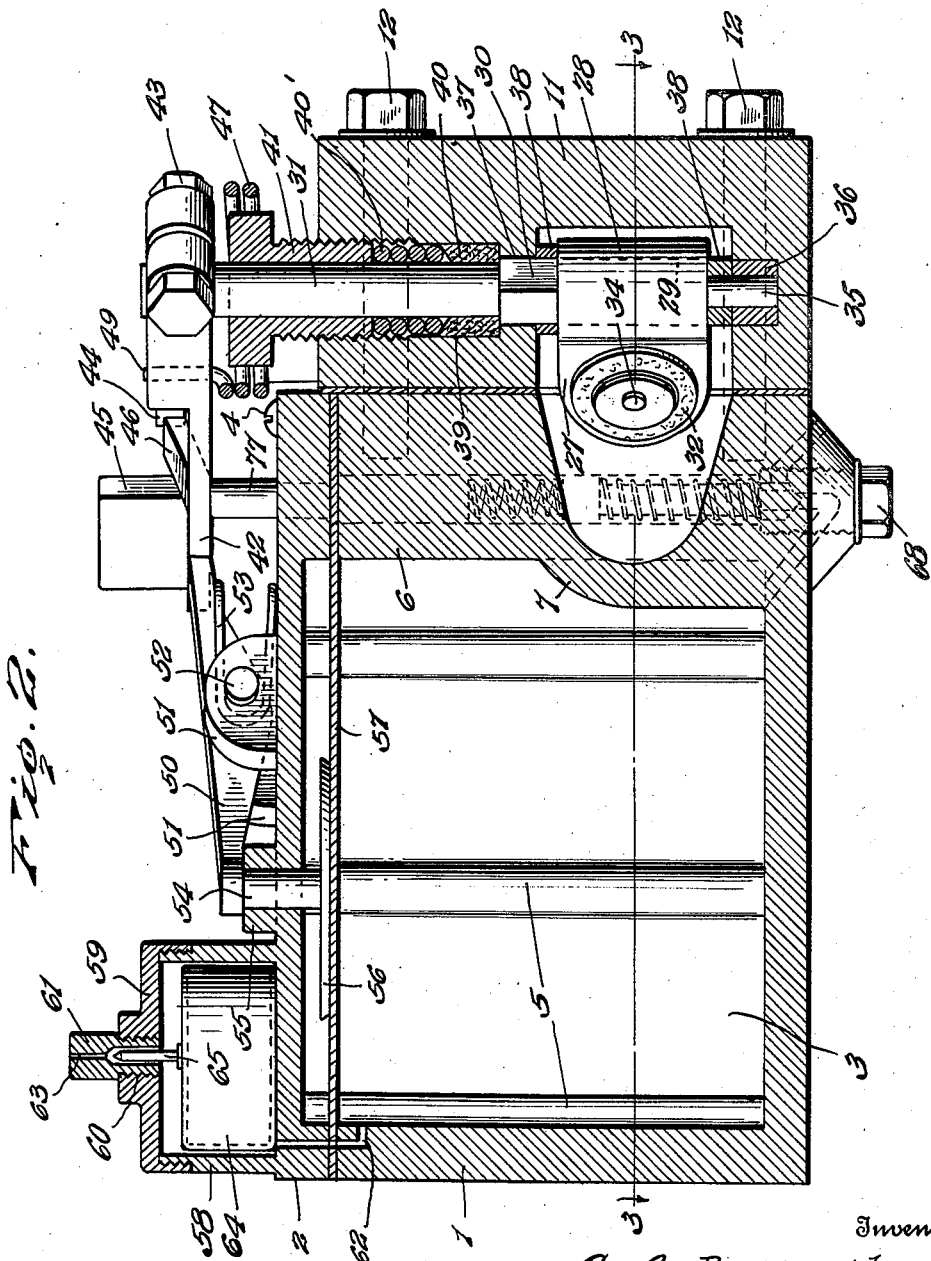

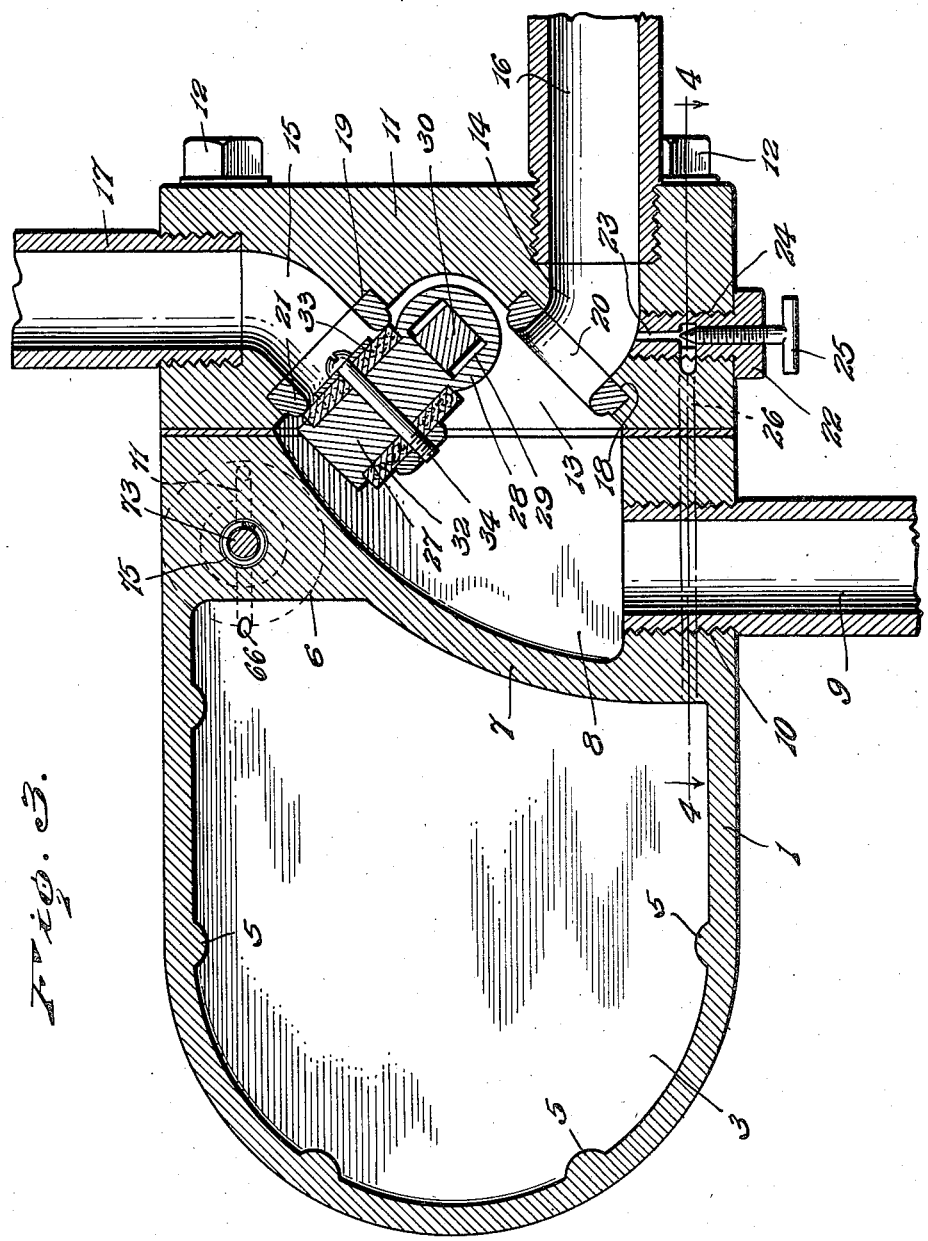

Dec. 10, 1940.   C. A. BURROUGHS   2,224,508
VALVE FOR LAWN SPRINKLERS
Filed Sept. 30, 1938   4 Sheets-Sheet 4
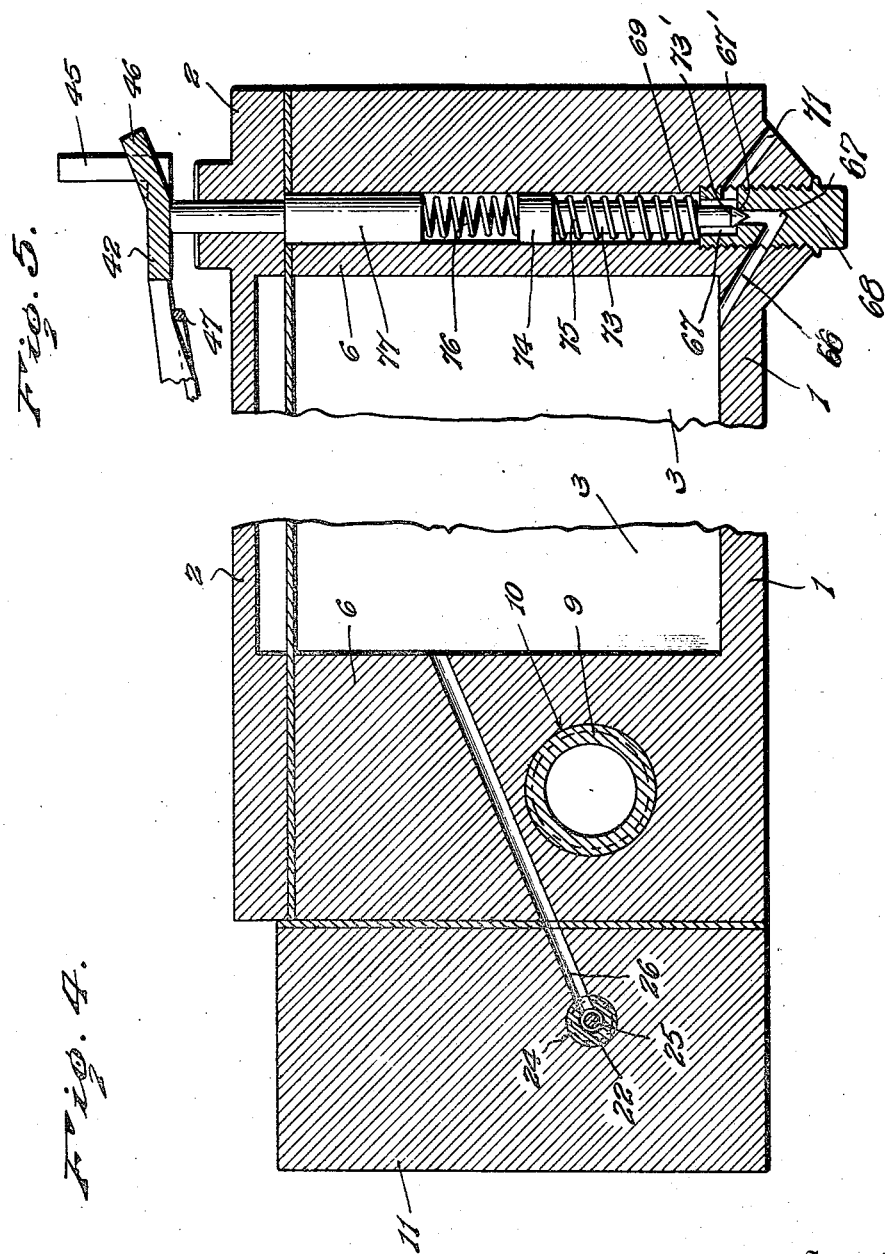
Inventor
C. A. Burroughs.
By Lacey & Lacey, Attorneys Patented Dec. 10, 1940

2,224,508

UNITED STATES PATENT OFFICE 2,224,508

VALVE FOR LAWN SPRINKLERS

Clarence A. Burroughs, San Diego, Calif.

Application September 30, 1938, Serial No. 232,671

6 Claims. (Cl. 137—139)

This invention relates to a lawn sprinkler valve and more particularly to a device which, when installed in a sprinkler system for a lawn, controls flow of water through a pipe or hose leading to an outlet nozzle or series of nozzles and assures a proper supply of water under desired pressure.

At the present time it is customary to water a lawn in the latter portion of the afternoon or just after dinner in the early evening and as most people water their lawns at about the same time this causes such a drain upon the city water system that flow of water will be cut down and pressure greatly reduced. Therefore, a proper flow of water at desired pressure is not obtained whereas, if the lawn were watered late at night at about the time most people retire or have finished watering their lawns a good supply of water at high pressure could be obtained.

One object of the invention is to provide a device which, when installed in a lawn-watering system or between a water pipe and a hose into a sprinkler nozzle, will permit ample flow of water and after a predetermined length of time shut off the water. Therefore, the lawn may be watered late at night and as the water will be automatically shut off after a predetermined length of time instead of having to be manually shut off, the owner may set the sprinkler in operation and, if so desired, retire for the night and know that the water will be shut off at the proper time.

Another object of the invention is to provide a device of this character so constructed that a sprinkler system consisting of a series of sprinklers for a large lawn may be connected in series and the sprinklers successively set in operation, the first sprinkler being operated for a certain length of time and then shut off and water delivered to the next sprinkler until all of the sprinklers have been operated and flow of water then completely shut off. It will thus be seen that the sprinklers of a system will be individually and successively operated and each supplied with a good flow of water at high pressure whereas, if all of the sprinklers were operated at the same time, none of the sprinklers would receive a sufficient flow of water and the pressure would be reduced to such an extent that a good fountain spray would not be produced at any of the sprinklers.

Another object of the invention is to provide a device of this character wherein a latch for releasably holding a valve in one position of adjustment is adapted to be moved to a valve releasing position by pressure created by water gradually filling a water chamber, the length of time required for filling the chamber determining the length of time a sprinkler will be in operation.

Another object of the invention is to provide a device of this character which is comparatively simple in construction and is not liable to get out of order.

The invention is illustrated in the accompanying drawings, wherein:

Figure 1 is a top plan view of the sprinkler-controlling device,

Figure 2 is a vertical sectional view taken longitudinally through the same upon the line 2—2 of Figure 1, Figure 3 is a horizontal sectional view taken along the line 3—3 of Figure 2, Figure 4 is a fragmentary view taken along the line 4—4 of Figure 3, and Figure 5 is a fragmentary sectional view taken along the line 5—5 of Figure 1.

This improved sprinkler-controlling device has a casing or body 1 which is formed of strong cast metal and has a removable top wall or cover 2 constituting a closure for a water chamber 3. This top wall or cover 2 is removably secured by a suitable number of screws 4 in order that it may be removed when necessary. Side walls of the water chamber are reinforced by inwardly extending ribs 5 at points where threaded sockets to receive the screws 4 are formed and thus prevent these walls from being weakened. The end wall 6 of the casing or housing is of appreciably increased thickness and for a portion of its length is curved inwardly, as shown at 7, in order that this wall may be recessed from its outer face, as shown in Figures 2 and 3, to provide a valve chamber 8 into which water is fed from a source of supply by means of a pipe 9 threaded through an opening 10 formed in the wall 6 at one end thereof, as shown in Figure 3. A block 11 is secured against the end wall 6 by screws 12 and this block has its inner face formed with a recess 13 which registers with the chamber 8 and constitutes a continuation of the valve chamber. Outlet openings 14 and 15 lead from the recess 13 and have their outer end portions enlarged and threaded to receive pipes 16 and 17, the pipe 16 constituting a pipe leading to a sprinkler or a series of sprinklers for a lawn and the pipe 17 leading to another sprinkler or series of sprinklers. When only one sprinkler or group of sprinklers is used, the pipe 17 will be omitted and the opening 15 closed by a plug screwed into its threaded outer end portion. Annular pockets 18 and 19 are formed about inner ends of the openings 14 and 15 and within these pockets are disposed valve seats 20 and 21 which may be formed of any suitable material and project from the pockets, as shown in Figure 3. A plug 22 formed with a longitudinally extending bore 23 is screwed into a threaded opening 24 formed through one end of the block 11 and in this plug 22 is mounted a needle valve 25, by means of which flow of water from the passage 14 through the bore 23 and through a passage 26 into the water chamber 3 may be controlled. By properly adjusting the needle valve the length of time required for water to fill the chamber 3 may be controlled and the length of time a lawn will be sprinkled by water flowing through the pipe 16 controlled.

In order to control flow of water from the water chamber 8 through the pipes 16 and 17, there has been provided a valve 27 formed of strong metal and at one end provided with a hub 28 formed with a bore 29 through which extends the squared portion 30 of a valve stem 31. Sealing disks 32 and 33 are secured against opposite side faces of the valve 27 by a bolt 34, and these sealing disks are intended to have contacting engagement with the valve seats 20 and 21 in order to alternately shut off flow of water through the pipes 16 and 17. The forward opening or bore 29 of the hub 28 is in one direction of greater dimensions than the flared portion 30 of the valve stem. This is in order to permit the valve to be shifted transversely of the valve stem, and upon referring to Figure 3, it will be seen that due to this movement the sealing ring or disk 33 may be thrust into tight sealing engagement with the valve seat 21 and the sealing disk 32 similarly thrust into close contacting and sealing engagement with the valve seat 20. The valve stem has one end formed with a reduced trunnion 35 rotatably mounted in a bearing 36 and the other end portion of the squared portion 30 is rotatably engaged through an opening 37 leading from the upper end of the valve chamber. Spacing washers 38 are provided above and below the hub of the valve 27 to maintain the valve midway of the upper and lower walls of the valve chamber and thus dispose the valve in the proper position for engagement with the valve seats 20 and 21. Above its squared portion 30, the valve stem 31 is rotatably received in a packing chamber or pocket 39 in which packing 40 is provided about the valve stem, and in order to firmly compress this packing and prevent leakage as well as hold the packing against the upper end of the squared portion 30 and prevent upward movement of the stem, there has been provided a coiled spring 40' and a packing gland 41 which is screwed into the outer end portion of the pocket 39 and formed with a bore snugly receiving the valve stem. When the gland is tightened, the spring will be tensioned and the packing compressed and held firmly in place. A lever arm 42 is engaged about the upper or outer end portion of the valve stem and firmly secured by a clamping bolt 43, and since the portion of the valve stem about which the arm or lever is secured is circular in cross section adjustments may be made. An abutment 44 which is carried by the block 11 limits swinging movement of the valve in a direction to dispose the sealing disk 33 in engagement with the valve seat 21, and in order that this arm or lever may be easily grasped and manually swung to this position of adjustment, there has been provided an upstanding hand-hold 45. Adjacent this hand-hold or lip 45 the arm is cut and bent upwardly to provide a tongue 46 constituting a cam and serving a purpose to be hereinafter set forth. A coiled spring 47 which fits loosely about the packing gland 41, as shown in Figure 2, has one end connected with an anchoring block 48 and its other end portion bent to form a finger 49 projecting upwardly through an opening formed in the arm 42. This spring is tensioned when the arm is swung to the position shown in Figure 1 and the valve in closing relation to the passage 15, and when the arm is released, the spring will swing the arm to the position indicated by dotted line on this figure and move the valve into engagement with the valve seat 20 to shut off flow of water through the passage 14 and pipe 16.

In order to releasably hold the valve in the set position shown in Figures 1 and 3, there has been provided a latch 50 formed from a bar of strong metal and pivotally mounted between bearing brackets 51 by a pivot pin 52 which is passed through the latch and one bearing bracket and threaded through the other bearing bracket. A spring 53, which is coiled about the pin 52 and has straddling engagement with the latch, serves to urge one end of the latch upwardly for locking engagement with a side edge face of the arm 42. By forcing this end of the latch downwardly the arm may be released so that the spring 47 may move the valve out of engagement with the valve seat 21 and into engagement with the valve seat 20. When the arm is swung towards the position shown in full line in Figure 1, the cooperating end portion of the latch will be forced downwardly as the bar passes over it, and when the arm or bar is brought to a stop by engagement with the abutment 44, the spring 53 will move the latch into position to have abutting engagement with the edge face of the arm and secure the arm and valve in a set position for permitting flow of water from the pipe 9 through the chamber 8 and out through the pipe 16 to a sprinkler or number of sprinklers. The outer end or rear end of the latch extends over a plunger 54 with which it is held in engagement by action of the spring 53. This plunger is slidably mounted through a bore 55 rising from the top wall or cover 2 of the casing and at its lower or inner end the plunger carries a large disk 56 having contacting engagement with a diaphragm 57 which is formed of pliable material and serves not only as a diaphragm but also as a means for forming a water-tight joint between the cover 2 and the walls of the casing 1. When the diaphragm and the plunger are forced upwardly by pressure within the chamber 3, the latch will be tilted about its pivot pin 52 and moved out of engagement with the arm 42. The valve will then be moved out of engagement with the valve seat 21 and into engagement with the valve seat 20 and flow of water through the pipe 16 cut off.

In order to control operation of the diaphragm, there has been provided a housing 58 extending upwardly from the cover 2 adjacent the boss 55. This housing has a cap 59 and at the center of the cap is formed a threaded opening 60 to receive an outlet nipple 61 so that air entering the housing 58 through a small opening 62 may escape from the housing through the outlet 63 of the nipple. A float 64 is loosely mounted in the housing 58 and carries an upstanding needle valve 65 which enters the nipple 61 and when the chamber 3 has become filled with water and water flows through the passage or opening 62 into the housing 58 to move the float 64 upwardly the needle valve 65 will be shifted upwardly to close the outlet opening 63. Pressure will then be developed within the chamber 3 by the incoming water to shift the diaphragm upwardly and the latch will be moved to a position for releasing the lever arm 42. It will thus be seen that within a very short period of time after the chamber 3 is filled with water the float valve will be moved to a closed position and the latch moved to release the lever arm and permit the spring 47 to move the valve 27 out of closing relation to the passage 15 and into position to close the passage 14. By properly adjusting the needle valve 25 the length of time required for the water to fill the chamber 3 may be regulated and since water will flow through the pipe 16 to the sprinklers as long as the valve is in the position shown in Figure 3 the length of time a lawn will be sprinkled after the valve has been moved to the position shown in Figures 1 and 3 may be regulated.

When the valve is moved into position to shut off flow of water through the pipe 16 to a sprinkler, water will flow through the pipe 17 to another sprinkler or set of sprinklers, but if a second set of sprinklers has not been provided, the opening 15 from which the pipe 17 extends may be plugged. By providing the opening 15 for receiving the pipe 17, flow of water to a second sprinkler may be provided after the first sprinkler has been operated a sufficiently long period of time to thoroughly sprinkle a lawn and another portion of the lawn then sprinkled, this being repeatedly carried out until all of a large lawn has been watered. Each sprinkler or set of sprinklers will be provided with a good flow of water at sufficient pressure and all portions of the lawn properly watered, whereas if successive sprinkling of various portions of the lawn were not provided for and a large number of sprinklers fed with water at the same time, there would not be a sufficient flow of water or sufficient pressure. When the valve is moved into position to shut off flow of water to the pipe 16, it is necessary to have the chamber 3 drained of water so that the latch may be returned to its normal position by the spring 53 and the chamber 3 emptied so that, when the apparatus is again used, it may be gradually filled with water and sprinkling carried out for a predetermined length of time before the valve is again moved from the set position to its normal position in which flow of water through the pipe 16 will be cut off. In order that the valve may be drained, there has been provided an outlet port or opening 66 leading from the bototm of the water chamber to a pocket 67 formed in a plug 68 screwed into the lower end of a well 69 formed vertically through the end wall of the casing. The cup or pocket 67 has a side outlet 70 which registers with an outlet opening 71 formed through a boss 72. A needle valve 73 having a point 73' at its lower end for engaging the valve seat 67' and closing the water passage 66 is slidably mounted in the well 69 and provided at its upper end with a head 74 engaged by a coiled spring 75. This spring is coiled about the needle valve and urges the needle valve upwardly towards an opened position. A stronger spring 76 is disposed above the needle valve with its lower end resting upon the head 74 and its upper end bears against the lower end of a plunger 77. This plunger is slidable vertically in the well and urged upwardly by the springs 75 and 76 when the plunger is forced downwardly by the arm 42 moving into engagement with its upper or outer end, and since the spring 76 is of greater strength than the spring 75, the needle valve 73 is forced downwardly to a closed position and allows the chamber 3 to be filled with water. When, however, the arm 42 is released and returned to the position indicated by dotted lines in Figure 1, the plunger 77 will be forced upwardly by expansion of the spring 76, and since this spring will then no longer be under tension the spring 75 may shift the needle valve upwardly and water may drain from the chamber 3 out through the opening 66 and through the passages 69, 70 and 71. The tongue 46 constitutes a cam which is moved into engagement with the outer end of the plunger 77 as the arm 42 is swung towards the set position shown in Figure 1. Therefore, the plunger 77 will be moved downwardly by a cam action and assume a position under the arm 42.

When this device is in use, it is installed by connecting the water pipe 9 with the opening 10 and then screwing the pipe 16 of the sprinkler into the opening 14. A second pipe 17 is screwed into the opening 15 and at its other end will be screwed into the opening 10 of another one of the devices, this being repeated until a suitable number of the devices have been distributed about a large lawn and the pipe 16 of a corresponding number of sprinklers connected with them. When it is desired to have the lawn watered, it is merely necessary to grasp the arm or lever 42 by its hand-hold 45 and swing it to the set position of Figure 1 where it will be held by the latch 50. Water may then flow from the chamber 8 through the pipe 16 to a sprinkler and at the same time a small amount of water will flow through the passage 26 and into the chamber 3 to gradually fill this chamber 3 with water. The length of time it takes to fill the chamber 3 may be controlled by properly setting the needle valve 25. As the chamber 3 fills with water, air in the chamber will be passed out through the port 62 into the housing 58 and out through the port 63 of the nipple 61. When the chamber 3 is filled with water, water will then flow through the opening 62 into the housing 58 and the float 64 will be shifted upwardly to close the port 63. Pressure will then be developed in the chamber 3 and the diaphragm 57 and plunger 54 shifted upwardly so that the plunger will act upon the end of the latch 50 over it and cause the latch to be tilted about its pivot pin 52. During this movement of the latch the end thereof engaging the side edge of the lever arm 42 will be moved downwardly until this lever arm is free and the spring 47 will then return the valve 27 from the set position in closing relation to the opening or passage 15 to its normal position in closing relation to the passage 14. Flow of water to the sprinkler will thus be cut off but water will now be permitted to flow through the pipe 17 and operate another sprinkler. A large number of sprinklers may thus be successively operated and a large lawn progressively watered with ample water supply under proper pressure. When the last section of a lawn has been watered, all flow of water will be shut off and a plug in the outer end of the passage 15 will prevent escape of water when the valve 21 moves into position to shut off flow of water through the pipe 16. It is, of course, understood that, if only one sprinkler is in use, flow of water will be entirely shut off as soon as the valve 27 moves out of engagement with the valve seat 21 and into engagement with the valve seat 20 due to the fact that the outer end of the passage 15 will be plugged. Upward movement of the valve 73 by the spring 75 when the lever arm moves from the set position of Figure 1 to the normal position indicated by dotted lines therein will permit drainage of water from the chamber 3 and the chamber 3 will be emptied so that, when the device is again in use, it may be gradually filled. By this arrangement a lawn may be watered for a predetermined length of time and the water shut off without its being necessary for a person to manually shut off the water. A person desiring to water his lawn may, therefore, start the sprinkler late in the evening when there is a good flow of water at proper pressure and if so desired retire for the night and know that the lawn will be sprinkled for the proper length of time and then automatically shut off without further attention by him.

Having thus described the invention, what is claimed as new is:

1. In a device of the character described, a body having a valve chamber therein provided with an inlet and main and auxiliary outlets and constituting a water passage, a valve in said chamber yieldably held in closing relation to the main outlet and movable to a set position in closing relation to the auxiliary outlet, the body being formed with a second chamber constituting a pressure chamber and having an outlet at its top, pressure-actuated means for moving said latch to a releasing position operating in said pressure chamber, a reduced water passage being provided for diverting water from said valve chamber into said pressure chamber, means for controlling flow of water through the reduced water passage and controlling time required for filling the pressure chamber with water, and a float valve for closing the outlet at the top of the pressure chamber moved to close the outlet when the pressure chamber is filled with water.

2. A device of the character described comprising a body having a valve chamber therein provided with an inlet for water and main and auxiliary outlets for water, said body also being provided with a pressure chamber and with a reduced passage for conducting water from the main water outlet to the pressure chamber, means for controlling flow of water through the reduced water passage whereby time required for filling the pressure chamber may be controlled, a valve in said valve chamber movable from a position in closing relation to the main outlet to a set position in closing relation to the auxiliary outlet, a handle for said valve, a latch for engaging said handle and releasably holding the valve in closing relation to the auxiliary outlet, a pressure-actuated device for moving said latch to its releasing position operating in said pressure chamber, said pressure chamber having an outlet at its top, and a float valve movable into position to close the outlet of the pressure chamber when the pressure chamber is filled with water.

3. A device of the character described comprising a body formed with a valve chamber having an inlet and main and auxiliary outlets and constituting a water passage, the body also having a chamber constituting a pressure chamber and communicating with the main outlet, means for controlling flow of water from the main outlet into said pressure chamber to gradually fill the same during flow of water through the main outlet, a valve in said chamber movable from a position in closing relation to the main outlet to a set position in closing relation to the auxiliary outlet, said valve having a stem projecting externally of the body, a handle carried by the outer end of the valve stem, a latch for engaging said handle and holding the valve in closing relation to the auxiliary outlet, pressure-actuated means for moving said valve to a releasing position operating within the pressure chamber, the pressure chamber having an outlet port at its top and being also provided with a drain communicating with its bottom, a float valve for shutting off flow of air through the outlet port when the pressure chamber is filled with water and effecting building up of pressure in the pressure chamber to actuate the means for moving the latch to a releasing position, and a valve for the drain adapted to be moved to a closed position by the handle when the handle is in engagement with said latch.

4. A device of the character described comprising a body formed with a pressure chamber and having an end wall formed with a recess, a block secured against the said end wall of said body and formed with a recess registering with the recess of the body and together therewith forming a valve chamber, the body having an opening constituting an inlet for the valve chamber and said block having openings constituting a main outlet and an auxiliary outlet for the valve chamber, a valve stem journaled vertically in said block with a portion extending through the valve chamber, a valve carried by said stem within the valve chamber and having swinging movement when the stem is turned from a position in closing relation to the main outlet to a position in closing relation to the auxiliary outlet, a handle carried by the upper end of said stem and extending across the top of said body, a spring anchored to the block and engaging said handle for normally holding the valve in closing relation to the main outlet, means for limiting swinging movement of the handle in a direction for moving the valve into closing engagement with the auxiliary outlet, a latch pivotally mounted upon said body for engaging said handle when moved to a set position, a diaphragm in said pressure chamber, a plunger extending upwardly from said diaphragm through the top of said pressure chamber and engaging said latch for moving said latch to a position to release the handle when the plunger is shifted upwardly, the body and block being formed with a passage for conducting water from the main outlet into the pressure chamber and filling the chamber, a manually adjustable valve for regulating flow of water through said passage and controlling time required for filling of the pressure chamber, the pressure chamber having an outlet port at its top, a housing carried by said body for receiving air and water through the port, said housing having an outlet port at its top, a float valve in said housing adapted to be moved upwardly when water enters the housing and close the outlet of the housing whereby pressure may build up in the pressure chamber and shift the diaphragm and plunger upwardly to move the latch to a releasing position, a drain for said pressure chamber, and a valve for said drain yieldably held open and held in a closed position by said handle when the handle is in its set position.

5. A device of the character described comprising a casing having a pressure chamber therein and having a wall formed with a recess, a cover for said casing, a housing carried by and rising from said cover, a cap for said housing, a nipple for said cap provided with an outlet, a float valve in said housing for closing the outlet when moved upwardly, said pressure chamber having an outlet communicating with said housing, a block carried by said casing and formed with a recess registering with the recess thereof to provide a valve chamber, a valve stem journaled vertically in said block with a portion extending through its recess, said casing being formed with an opening constituting an inlet for the valve chamber and the block having openings constituting a main outlet and an auxiliary outlet for the valve chamber, a valve in the valve chamber carried by the valve stem, a passage being provided for conducting water from the main outlet into said pressure chamber, means for controlling flow of water through the passage and regulating time required for filling of the pressure chamber, a handle carried by the upper end of said valve stem for turning the stem and moving the valve from a position in closing relation to the main outlet to a set position in closing relation to the auxiliary outlet, a latch pivoted over said cover and yieldably held in position for engaging said latch and releasably securing the handle in a set position, a diaphragm in the pressure chamber having a plunger extending upwardly through the cover for engaging the latch and moving the latch to a releasing position, a drain for the pressure chamber, a valve for closing said drain slidably mounted in a vertically disposed well, a spring yieldably holding the valve raised to an opened position, a plunger in said well, a spring between the plunger and the valve, and a cam carried by said handle for depressing the plunger and disposing the same under the handle for closing the valve when the handle is in its set position.

6. In a device of the class described, a body having a valve chamber provided with a water inlet and main and auxiliary water outlets, a pressure chamber in the body and communicating with the valve chamber, a valve in the chamber yieldably held in closing relation to the main outlet and movable to a set position in closing relation to the auxiliary outlet, a latch for releasably holding the valve in closing relation to the auxiliary outlet, means urging the valve toward the main outlet, means in the pressure chamber and actuated by pressure built up by water diverted from said valve chamber for releasing the latch and permitting said first-mentioned means to swing the valve to close the main outlet, and means which is operated by return of the latch to set position for permitting draining of the water from the chamber.

CLARENCE A. BURROUGHS.